UNITED STATES PATENT OFFICE.

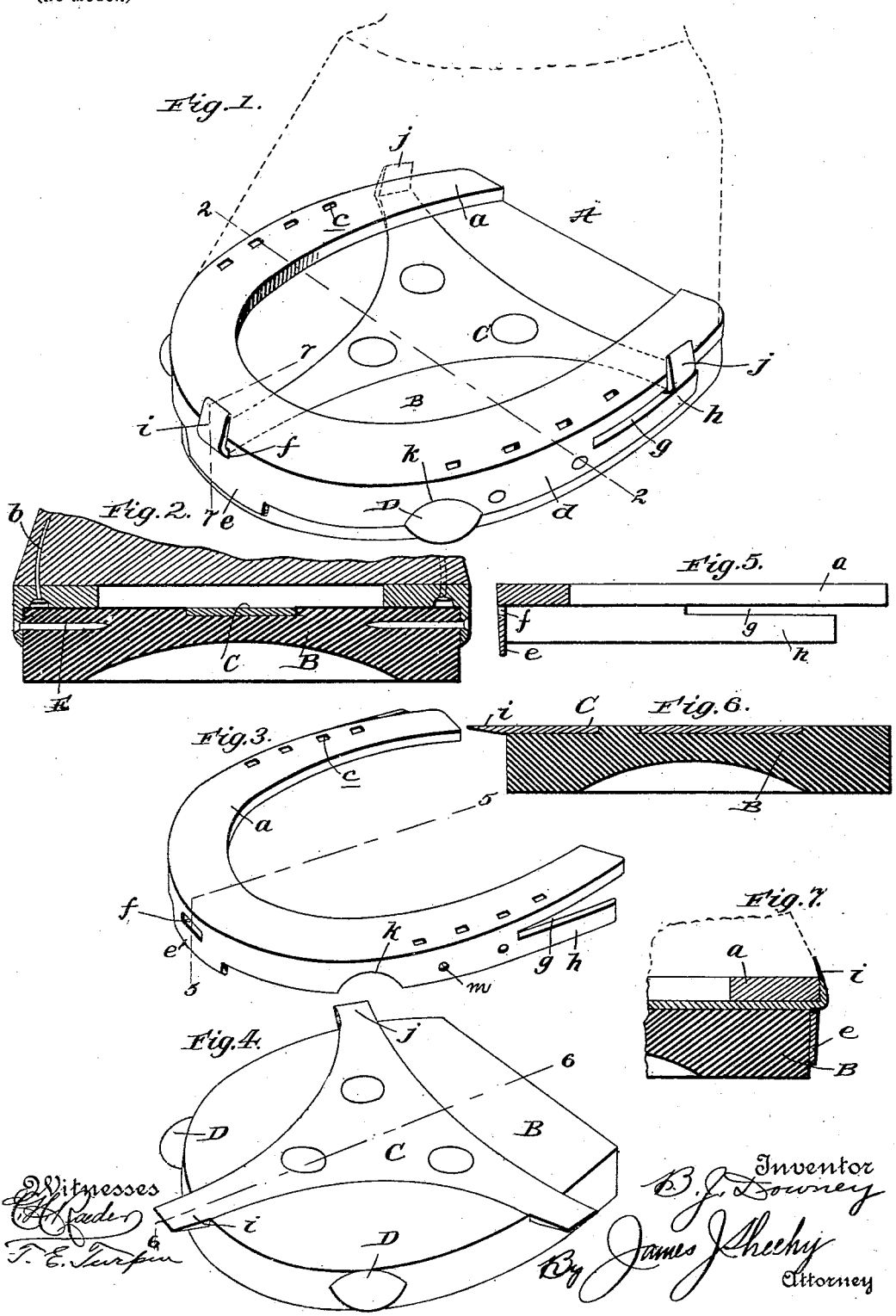

BRIAN J. DOWNEY, OF WASHINGTON, DISTRICT OF COLUMBIA.

SOFT-TREAD HORSESHOE.

SPECIFICATION forming part of Letters Patent No. 684,416, dated October 15, 1901.

Application filed March 14, 1901. Serial No. 51,135. (No model.)

*To all whom it may concern:*

Be it known that I, BRIAN J. DOWNEY, a citizen of the United States, residing at Washington, in the District of Columbia, have invented new and useful Improvements in Soft-Tread Horseshoes, of which the following is a specification.

My invention relates to improvements in horseshoes, and has for its general object to provide a soft-tread horseshoe comprising a metallic body adapted to be connected to a horse's hoof like the ordinary horseshoe, a pad of vulcanized rubber or other elastic material, and strong and durable means for connecting the pad to the body, such means being adapted to permit of the pad being readily connected to the body and as readily disconnected therefrom when it is desired to replace it with a new pad, and this without liability of the pad becoming loose or being casually disconnected while the shoe is in use.

Another object of the invention is the provision of a soft-tread horseshoe in which the pad, usually formed of vulcanized rubber, is prevented from contacting with a horse's hoof and an air-space is afforded between the pad and hoof, this being materially advantageous, because the pad is effectually prevented from heating and causing rotting of the hoof, which is the objection usually urged against soft-tread horseshoes.

Another object is to provide a horseshoe of the kind stated the metallic body of which is equipped with a toe portion calculated to enable a horse to secure a good foothold in pulling notwithstanding the employment of the elastic pad.

Other objects and advantages of the invention will be fully understood from the following description and claims when taken in conjunction with the accompanying drawings, in which—

Figure 1 is a perspective view illustrating my improved shoe as applied to a horse's hoof, the hoof being shown by broken lines. Fig. 2 is a transverse section taken in the plane indicated by the broken line 2 2 of Fig. 1. Fig. 3 is a perspective view of the metallic body of the shoe as it appears precedent to being connected to a horse's hoof. Fig. 4 is a perspective view of the pad removed. Fig. 5 is a longitudinal central section of the metallic body, taken in the plane indicated by the broken line 5 5 of Fig. 3. Fig. 6 is a section of the pad, taken on the broken line 6 6 of Fig. 4; and Fig. 7 is a detail section taken in the plane indicated by the broken line 7 7 of Fig. 1.

In the said drawings similar letters of reference designate corresponding parts in all of the several views, referring to which—

A is the metallic body of my improved shoe, which is of the general configuration common to horseshoes. The said body is preferably formed in one piece and comprises a horizontally-disposed U-shaped portion $a$, adapted to be placed against a horse's hoof and connected thereto by nails $b$, driven through holes $c$, and a flange $d$, which depends from the outer edge of the horizontal portion $a$, as shown. Said flange in the preferred embodiment of the invention extends throughout the intermediate portion of the body to points adjacent to the ends thereof and is provided with a forward portion $e$ of increased width, which constitutes a toe, an aperture $f$ in its forward portion immediately below the horizontal portion $a$, and bifurcations $g$ in its rear ends in a plane immediately below the portion $a$. The lower rear end portions $h$ of the flange formed by the bifurcations $g$ are preferably bent slightly outward, as best shown in Fig. 3, to permit of the ready introduction of the pad within the flange and are adapted to be then bent inwardly against the side edges of the pad to assist in holding the same in position, as will be hereinafter more fully pointed out.

B is the pad, which, as before stated, may be formed of vulcanized rubber or any other suitable elastic material, although the vulcanized rubber is the preferred material. The said pad is vulcanized on or otherwise suitably connected to a metallic plate C, which has its upper side flush with that of the pad and is provided with a forwardly-extending arm $i$ and laterally-extending arms $j$, all of which reach beyond the pad, as best shown in Fig. 4, and are adapted when the pad is applied to the body A to take into the aperture $f$ and bifurcations $g$ of said body and be bent up against a horse's hoof after the manner shown in Fig. 1. The pad B is preferably concave at its under side, as best shown in Figs. 2 and 4, so as to enable it to take secure hold of the ground by reason of suction and is preferably provided at about the points shown on its edge with protuberances D, which when the pad is placed in the body A are adapted to take into and rest in seats k in the flange d thereof. These protuberances are calculated to prevent injury to a horse in case of interference.

In practicing my invention the body A is nailed to a horse's hoof in the same manner as an ordinary horseshoe or is otherwise suitably connected thereto. The pad bearing the plate C is then introduced into the body from the rear and so that the arm or clip i enters the aperture f of the body flange, and the arms or clips j enter the bifurcations g of the body, and also so that the protuberances D on the pad take into the seats k. With this done the rear portions h of the flange d are bent inwardly until they rest against the pad and flush with the outer edge of the body portion a, and the clips i j are bent upwardly and inwardly against the horse's hoof, when the pad will be securely fixed in the body and held against casual disconnection therefrom and also against becoming loose. When, however, the pad is worn and it is necessary to replace the same with a new pad, the same may be readily accomplished by bending the clips i j down into a horizontal position and the flange portions h outwardly and then sliding the pad rearwardly out of engagement with the body to give place to a new pad, which is adjusted and connected to the body in the manner before described.

When my improved shoe is applied to a horse's hoof in the manner described, the pad B is held away from the hoof by the metallic portion a of the body, and an air-space, open at the rear, is afforded between the pad and the hoof. This is materially advantageous, since the rubber of which the pad is generally formed is effectually prevented from heating and causing rotting of the hoof.

The pad B is obviously calculated to thoroughly cushion the horse's hoof and insure a secure foothold, while the toe e of the metallic body A is adapted to enable the horse to take secure hold of the roadway in pulling, and this notwithstanding the employment of the pad. The toe e of body A is also adapted in practice to prevent undue wear of the toe portion of the pad.

When desirable, nails E, which may be plain or barbed, are employed as an additional means for securing the rubber pad in the metallic body. These nails take through apertures m in the body-flange d and into the pad after the manner clearly shown in Fig. 2.

I have entered into a detail description of the construction and relative arrangement of the parts embraced in the present and preferred embodiment of my invention in order to impart a full, clear, and exact understanding of the same. I do not desire, however, to be understood as confining myself to such specific construction and arrangement of parts, as such changes or modifications may be made in practice as clearly fall within the scope of my claims.

Having described my invention, what I claim, and desire to secure by Letters Patent, is—

1. A soft-tread horseshoe comprising a metallic body adapted to be connected to a horse's hoof and having openings, and a pad provided with clips arranged to enter said openings in the body and adapted to be bent against the outside of said body so as to connect the pad thereto.

2. A soft-tread horseshoe comprising a metallic body adapted to be connected to a horse's hoof, and having the rear portions h separated by bifurcations from its main portion, and also having a depending forward portion provided with an opening, and a pad provided with clips arranged to enter the bifurcations and opening in the body and adapted to be bent against the outside of said body so as to connect the pad thereto; said pad being also adapted to be held by the portions h of the body when said portions are bent inwardly.

3. A soft-tread horseshoe comprising a metallic body having a horizontal portion, and a flange depending therefrom and provided with an opening in its forward portion and bifurcations in its ends, a pad, and a plate connected to the pad and having clips extended beyond the same and arranged to enter the opening and bifurcations of the body; the said clips being adapted to be bent against the outside of the body, and the rear lower portions of the flange of the body, formed by the bifurcations, being adapted to be bent against the pad.

4. A soft-tread horseshoe comprising a metallic body adapted to be connected to a horse's hoof and having openings, a pad, and a plate secured to the pad and provided with portions arranged to enter the openings in the body and adapted to be bent against the outside of said body to connect the pad thereto.

5. A soft-tread horseshoe comprising a metallic body having a U-shaped horizontally-disposed portion, and a flange depending therefrom and provided with openings, a pad of rubber or other suitable material arranged within the flange and at the under side of the horizontal portion of the body whereby an air-space, open at the rear, is afforded between it and a horse's hoof, and clips on the pad arranged to enter the openings in the body-flange and adapted to be bent against the outside of the body to connect the pad thereto.

6. A soft-tread horseshoe comprising a metallic body adapted to be connected to a horse's hoof and having a horizontal portion, and a flange depending therefrom and provided with seats k, a pad arranged within the flange of the body and having protuberances on its edge resting in the seats of said flange and projecting laterally outward beyond the same, and suitable means for connecting the pad to the body.

7. A soft-tread horseshoe comprising a metallic body having a horizontal portion, and a flange depending from the outer edge of the horizontal portion, and having a forward portion of increased width constituting a toe, and also having an opening in its forward portion and bifurcations in its ends, a pad arranged below the horizontal portion of the body and within the flange thereof, and a plate secured to the pad and having portions extended beyond the same and adapted to enter the opening and bifurcations in the flange of the body and be bent against the outside of said body.

8. A soft-tread horseshoe comprising a metallic body adapted to be connected to a horse's hoof and having a horizontal portion and a flange depending therefrom and provided with a seat $k$, a pad arranged within the flange of the body and having a protuberance on its edge resting in the seat in the body-flange and projecting laterally outward beyond said flange, and means connecting the pad to the body.

In testimony whereof I have hereunto set my hand in presence of two subscribing witnesses.

BRIAN J. DOWNEY.

Witnesses:
GRAFTON L. MCGILL,
THOMAS E. TURPIN.